United States Patent
Barish et al.

(10) Patent No.: US 8,196,437 B2
(45) Date of Patent: *Jun. 12, 2012

(54) INCREASING THE CLADDING-TO-CORE RATIO (D/D) OF LOW D/D CORE RODS IN OPTICAL FIBER PREFORMS

(75) Inventors: Eric L. Barish, Cumming, GA (US); Joseph P. Fletcher, III, Marietta, GA (US); Fengqing Wu, Duluth, GA (US)

(73) Assignee: OFS Fitel, LLC, Norcross, GA (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/902,316

(22) Filed: Oct. 12, 2010

(65) Prior Publication Data
US 2011/0023551 A1 Feb. 3, 2011

Related U.S. Application Data

(63) Continuation of application No. 11/801,365, filed on May 9, 2007, now Pat. No. 7,836,728.

(51) Int. Cl.
*C03B 37/01* (2006.01)
*C03B 37/012* (2006.01)
*C03B 37/02* (2006.01)

(52) U.S. Cl. .............. 65/412; 65/414; 65/421; 65/428; 65/429

(58) Field of Classification Search .............. 65/412, 65/414, 421, 428, 429
See application file for complete search history.

(56) References Cited

U.S. PATENT DOCUMENTS

| | | | |
|---|---|---|---|
| 4,195,980 A | 4/1980 | Sterling et al. | |
| 4,407,667 A | 10/1983 | La Noane et al. | |
| 6,131,414 A | 10/2000 | Shimizu et al. | |
| 6,131,415 A | 10/2000 | Chang et al. | |
| 6,434,975 B2 | 8/2002 | Berkey | |
| 6,460,378 B1 | 10/2002 | Dong et al. | |
| 6,574,994 B2 | 6/2003 | Cain et al. | |
| 7,836,728 B2 * | 11/2010 | Barish et al. | 65/412 |
| 2006/0216527 A1 | 9/2006 | Fletcher, III | |

* cited by examiner

*Primary Examiner* — Khanh P Nguyen
*Assistant Examiner* — Carson Gross
(74) *Attorney, Agent, or Firm* — Law Office of Leo Zucker

(57) ABSTRACT

Core rod sections useable for production of finished optical fiber preforms are fabricated by inserting one or more core body pieces axially end-to-end inside a glass cylinder, thereby defining joints between adjacent ones of the inserted pieces. The cylinder is mounted with the contained core body pieces in the region of a furnace. The glass cylinder and core body pieces are heated together in the furnace, thereby elongating the cylinder and the core body pieces contained in the cylinder, and the cylinder collapses to form a finished core rod. Core rod sections are cut from the finished core rod at positions that coincide with the joints between the core body pieces. One or more of the cut core rod sections are useable for the production of optical fiber preforms.

13 Claims, 2 Drawing Sheets

INCREASING THE CLADDING-TO-CORE RATIO (D/D) OF LOW D/D CORE RODS IN OPTICAL FIBER PREFORMS

CROSS REFERENCE TO RELATED APPLICATION

This application is a continuation under 35 U.S.C. §120 of our U.S. patent application Ser. No. 11/801,365 filed May 9, 2007, now U.S. Pat. No. 7,836,728 and titled "Increasing the Cladding-to-core Ratio (D/d) of Low D/d Ratio Core Rods in Optical Fiber Preforms".

BACKGROUND OF THE INVENTION

1. Field of the Invention

This invention concerns the manufacture of glass preforms for drawing optical fibers.

2. Discussion of the Known Art

To reduce costs associated with the manufacture of optical fiber preforms, as few steps as possible should be performed when carrying out the manufacturing process. Yet, at present, a large number of processing steps are actually required when fabricating such preforms. For example, in order to produce AllWave® optical fiber available from OFS Fitel, a glass preform is initially fabricated by:

1. Making an original core body using, e.g., a known vapor axial deposition (VAD) process;
2. Stretching the VAD core body into an intermediate core rod for analysis;
3. Performing an index profile measurement, and stretching the core rod further to a determined size; and
4. Jacketing the core rod with an overcladding glass tube or cylinder of proper size.

See U.S. Pat. No. 6,131,415 (Oct. 17, 2000). See also, U.S. Pat. Application Pub. No. 2006/0216527 (Sep. 28, 2006) which discloses an optical fiber preform that is assembled by inserting a number of core rod segments inside an innermost one of two or more concentric overclad tubes, and U.S. Pat. No. 6,460,378 (Oct. 8, 2002) disclosing a multiple overclad optical fiber preform. All relevant portions of these patent references are incorporated herein by reference.

When drawn from a preform, the above mentioned AllWave fiber has an outside (cladding) diameter of 125 microns, with a typical inner core diameter of 8.3 microns. A key feature of the AllWave fiber is that its optical loss at 1385 nm wavelength does not exceed 0.31 dB/km. This low loss is attributable mainly to a reduced level of hydroxyl (OH) impurities in the fiber glass, especially within the fiber's core or near the core region.

The original VAD core body obtained in step 1 above is typically made with an outer cladding layer that surrounds the inner core. The ratio of the outside diameter of the cladding layer to the diameter of the core is called the D/d ratio for the core body, wherein D is the diameter of the outer cladding and d is the diameter of the inner core. A typical VAD core body has a D/d ratio in a range of from 3 to 6. But core bodies with D/d ratios of 4 or less (referred to as "low D/d ratio" core bodies) are not uncommon and are actually preferred, since they achieve a greater fiber yield than core bodies of the same size having higher D/d ratios. That is, as the D/d ratio increases for a core body of a given size by reducing the core diameter (d), the yield of useful fiber that can originate from the core body is also reduced and the overall cost of producing a given quantity of fiber increases significantly.

Steps 2 and 3 above involve many glass working procedures and are very time consuming. Also, because the original VAD core body may not always have a uniform cross section over its entire length, it is difficult to achieve a uniform diameter for the intermediate core rod in step 2. Unwanted scrap therefore results.

In step 4, the forming and the preparation of the overcladding glass cylinder also involves many steps and high costs. For example, a typical overcladding cylinder is made as follows:

A. Provide a target rod or mandrel suitable for soot deposition. Such a mandrel is typically formed of alumina.

B. Deposit silica glass soot on the mandrel until a determined weight of the deposited soot is attained. The deposited soot object may weigh up to several hundred pounds.

C. Upon completion of the soot deposition, the alumina mandrel is removed so that a central bore remains in the soot object.

D. The soot object is placed in a sintering furnace for dehydration with the aid of a special fixture, and the object is then consolidated at an elevated temperature near 1500 degrees C. The consolidated object is typically referred to as a glass cylinder.

E. Because the wall of the central bore in the cylinder is typically rough, mechanical grinding and honing is needed to ensure that the wall surface is sufficiently smooth.

F. Because multiple torches are typically used for the soot deposition process in step B, the outside diameter (OD) of the cylinder is usually not uniform over the length of the cylinder. Mechanical grinding of the cylinder's outside circumference then becomes necessary to reduce such variations in the cylinder OD.

G. The cylinder is stretched down to a determined size for overjacketing of the core rod obtained in step 3 above.

Accordingly, many costly steps are involved in producing the overjacketing cylinders, with much associated scrap. One way to reduce these costs would be to use a direct soot overcladding process on the intermediate core rod, and thus eliminate a number of the processing and machining steps associated with the glass cylinder.

For a low D/d ratio core rod it is important in step 4 above to ensure that the interface between the outer cladding layer of the rod and the overjacketing cylinder, remains clean and free of contamination. The quality of this interface is critical with respect to the performance of optical fiber drawn from the finished preform. Direct soot over-cladding deposition on a low D/d ratio core rod will typically generate a so-called "wet" glass layer on the surface of the rod due to the presence of hydrogen and oxygen in the torch flames used to deposit the soot cladding. For a low D/d ratio core rod, the wet glass layer acts to prevent drawing of so-called low water or zero water peak fiber (e.g., the mentioned AllWave fiber) from the preform, due to an overlap of the wet glass layer with regions of the fiber cladding that are near the core and in which light is also transmitted.

In summary, two characteristics of the current procedures for making glass preforms for optical fibers contribute to high production costs; namely, (1) the relatively large number of costly and time-consuming process steps, and (2) the fabrication of the glass cylinder for overjacketing the core rod. Because of the low D/d ratios of the core rods, costs associated with the cylinder in steps 3 and 4 above cannot be eliminated simply by substituting a direct soot overcladding deposition process on the intermediate core rod obtained in step 2. Such a process would introduce the mentioned wet glass layer into the rod and impair fiber performance.

SUMMARY OF THE INVENTION

According to the invention, a method of fabricating core rod sections useable for the production of optical fiber preforms, includes inserting one or more core body pieces axially end-to-end inside a glass cylinder, thereby defining joints between adjacent ones of the inserted pieces. The cylinder is mounted with the contained core body pieces in a furnace, and heated. The cylinder and core body pieces elongate together in the furnace, and the cylinder collapses to form a finished core rod. Core rod sections are cut from the finished core rod at positions that coincide with the joints between the core body pieces. One or more of the core rod sections are useable for the production of optical fiber preforms.

For a better understanding of the invention, reference is made to the following description taken in conjunction with the accompanying drawing and the appended claims.

DETAILED DESCRIPTION OF THE INVENTION

The present invention overcomes the earlier mentioned impediments to cost reduction in the manufacture of optical fiber preforms by incorporating, inter alia, a direct soot overcladding deposition process. The process allows the number of glass working steps to be reduced, and the cladding to core ratios (D/d) of core rods used to fabricate the preforms to increase, all without impairing the performance or yield of fiber drawn from the preforms.

Figure 1:
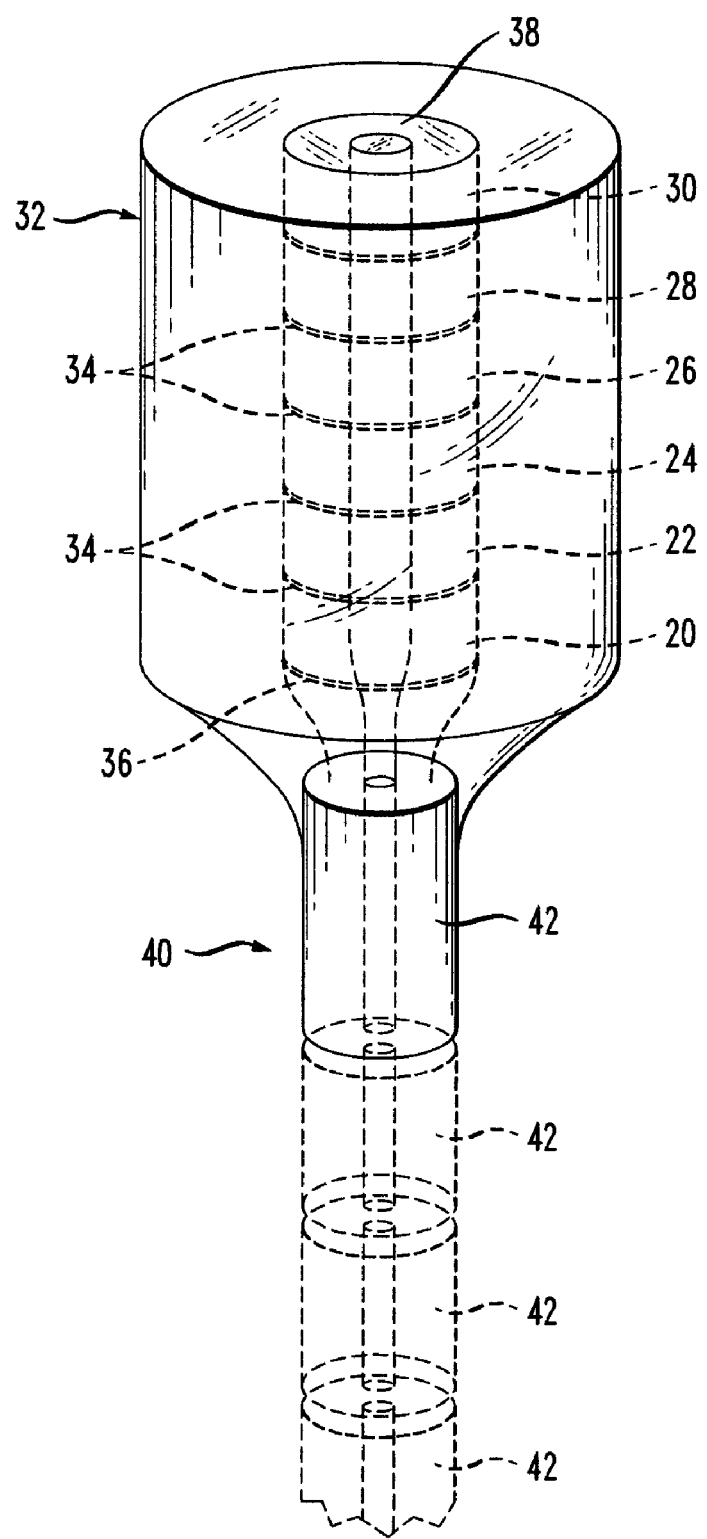
FIG. 1 schematically represents the formation of a core rod for use in the manufacture of an optical preform, according to the invention.
Figure 2:
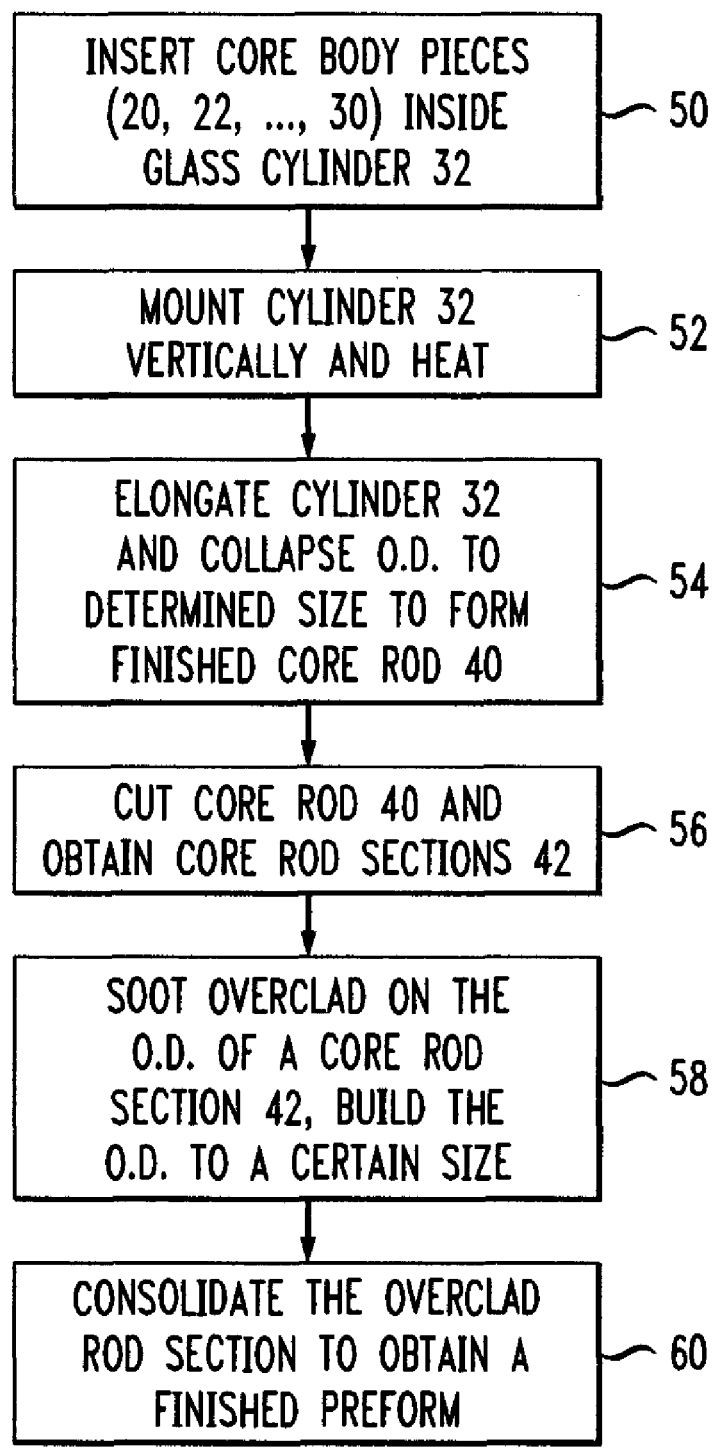
FIG. 2 is a flow chart showing steps in the manufacture of the preform, according to the invention.

FIG. 1 depicts an example of the formation of a core rod for use in manufacturing a glass preform, according the invention. In FIG. 1, six core body pieces 20, 22, . . . , 30 are initially inserted inside a glass sleeve or cylinder 32, and the cylinder is heated in a furnace so that it stretches or elongates with the aid of, e.g., a conventional pulling mechanism (not shown) causing the outside diameter of the cylinder 32 to collapse. The elongated, collapsed cylinder 32 yields a finished core rod 40 from which a number of (e.g., six) core rod sections 42 may be cut. Each rod section 42 has, for example, an outside (cladding) diameter of, e.g., about 70 mm and a length of, e.g., about 1900 mm. FIG. 2 is a flow chart identifying various steps of the inventive technique, a detailed example of which is given below.

EXAMPLE

1. Select a number of pieces (e.g., six pieces) of original VAD core bodies 20, 22, 24, 26, 28, 30 each having an initial core diameter of approximately 30 mm, and an initial cladding diameter of approximately 90 mm. The cladding to core diameter ratio (D/d) of the core body pieces may be four or less. Cut both axial ends of each piece substantially flat so that the piece is approximately 500 mm long. Because the core body pieces 20, 22, . . . , 30 will not be directly exposed to a hydrogen/oxygen flame process, they may be cleaned using only a light HF acid etch or a high pressure water spray.

2. Place the core body pieces axially end to end inside an approximately three meter long glass cylinder 32 having such inner and outer diameters that core rods to be produced will have D/d ratios greater than about five. See FIG. 2, step 50. For example, the cylinder 32 may be formed from pure silica glass, or from silica glass that is doped with fluorine or germanium. As seen in FIG. 1, joints 34 are defined between adjacent ones of the core bodies inside the cylinder 32. The inner diameter of the cylinder 32 may be approximately 95 mm, and the outer diameter of the cylinder may be approximately 180 mm.

3. A sacrificial piece or handle (not shown) is preferably attached to a bottom end of the glass cylinder 32 to prevent the core body pieces 20, 22, . . . , 30 contained in the cylinder from escaping when the cylinder is mounted vertically in step 4, below. If the attached piece is tube like, its inside diameter is preferably smaller than the diameter of the core body pieces contained in the cylinder 32.

4. Mount the glass cylinder 32 with the contained core body pieces 20, 22, . . . , 30 vertically on a graphite furnace tower, and perform a collapse-during-stretch operation. FIG. 2, step 52. Typical furnace temperatures may be near or slightly above 2000 degrees C. The cylinder assembly is then allowed to stretch or elongate so that the outside diameter (OD) of the cylinder collapses to an OD in the range of, e.g., 60 mm to 70 mm, to form a finished core rod 40 having an overall length of, e.g., between 20 and 30 meters. FIG. 2, step 54. The D/d ratio of the finished core rod 40 is thus greater than that of the original VAD core body pieces 20, 22, . . . , 30, and is preferably greater than five.

5. The finished core rod 40 may be "snap" cut during or at the end of the stretch and collapse process so as to yield a number (e.g., six) of core rod sections 42 each of a certain length, e.g., 1900 mm. FIG. 2, step 56. Specifically, the core rod 40 should be cut at those positions along its length that coincide with the joints 34 between adjacent ones of the VAD core bodies 20, 22 . . . , 30, and in the regions of those ends 36, 38 of the first and the last core bodies 20, 30 that face outwardly of the cylinder 32. End portions of the core rod sections 42 having a non-uniform cross section including, e.g., voids in regions that correspond to the joints 34 between the core bodies, should be trimmed and scrapped.

6. Perform necessary measurements on each finished (trimmed) core rod section 42, and directly deposit a determined amount of soot overcladding on the outside circumference of the rod section 42 to obtain a desired D/d ratio for the finished preform. For example, for a rod section 42 having an outside diameter of 70 mm and a D/d ratio higher than 5, suitable glass handles may be attached at both axial ends and the rod section 42 placed on a soot deposition machine for overcladding. Typical gas flow rates may be around several hundred liters per minute for each of the hydrogen and the oxygen gases. Silicon tetrachloride (SiCl4) gas may flow at a rate of approximately several hundred grams per minute. The soot is deposited on the circumference of the core rod section 42 until it builds to an outside diameter of, e.g., approximately 300 mm. FIG. 2, step 58. In order to obtain a uniform soot cladding diameter over the length of the core rod section 42, soot should be deposited a certain distance beyond both ends of the core rod sections in order to compensate for a known tapering effect that occurs in soot deposition processes.

7. The soot overcladded core rod section is placed inside a sintering furnace at a temperature near or above 1500 degrees C., to be consolidated into a transparent finished preform. Step 60. The consolidated, finished preform may typically measure 200 mm in outside diameter and have a length of up to 3 meters. The D/d ratio of the finished preform may be, for example, about 15 or greater.

An optical fiber may be drawn from the finished preform, for example, by placing the preform directly into a large graphite or zirconia draw furnace that is capable of handling a preform of such a size.

The core body pieces 20, 22, ..., 30 may be cleaned after they are inserted in the glass sleeve or cylinder 32 and just before performing the collapse-during-stretch operation in step 4 above, as follows.

I. Install the cylinder 32 with the inserted core body pieces 20, 22, ..., 30 on a stretching tower, making sure that handles attached at both ends of the cylinder are tube-like so that gases introduced through one of the handles can flow through gaps that exist between the core body pieces and the cylinder.

II. Flow one or more glass cleaning gases such as, for example, chlorine, a fluorine-containing gas, pure nitrogen, or mixtures thereof inside the cylinder 32.

III. Control the associated furnace temperature to be in a range of from about 1000 to 2200 degrees C.

IV. Move the cylinder with the inserted core body pieces through the furnace at such a speed that the chlorine or fluorine containing gases will perform the cleaning process at the elevated temperature. If necessary, multiple passes can be used to guaranty high quality interfaces.

V. Stop the flow of the reactive cleaning gas(es), and proceed with the collapse-during-stretch operation in step 4 above.

The inventive method eliminates many of the typical process steps required in the manufacture of optical fiber preforms including, without limitation:

a. The need for a handle attachment to the original VAD core body, and for stretching of the original core body in a furnace;

b. The stretching of the core rod further in order to match its dimensions with those of an overjacketing glass cylinder;

c. HF acid etching of the core rod; and d. The use of a mandrel to build the overjacketing cylinder using soot deposition, the smoothing of the cylinder bore, and the machining of the outside circumference of the cylinder.

It is contemplated that the use of direct soot overcladding deposition as disclosed herein can reduce manufacturing costs by 15% to 30% or more. The inventive technique may be applied to the manufacture of any optical fiber preform that originates from a VAD core body, with significant benefits in cost reduction and fiber yield.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method of fabricating core rod sections useable for production of finished optical fiber preforms, comprising:

inserting two or more core body pieces end-to-end axially inside a glass cylinder, thereby defining joints between adjacent ones of the inserted core body pieces;

mounting the glass cylinder with the contained core body pieces vertically in a region of a furnace;

heating the glass cylinder and core body pieces together in the furnace, thereby elongating the cylinder and the core body pieces contained in the cylinder;

collapsing the elongated cylinder so as to form a finished core rod; and cutting the finished core rod at one or more positions along the length of the core rod that coincide with the joints between adjacent ones of the core body pieces, thereby yielding a number of core rod sections one or more of which are useable for the production of optical fiber preforms.

2. The method of claim 1, including providing the core body pieces with a cladding to core diameter ratio (D/d) of four or less.

3. The method of claim 1, wherein the finished core rod is formed with a D/d ratio that is greater than that of the core body pieces.

4. The method of claim 1, including forming a core body using a vapor axial deposition (VAD) process, and cutting the core body to obtain the core body pieces.

5. The method of claim 1, including providing the glass cylinder with a length of approximately three meters.

6. The method of claim 1, including forming the glass cylinder from pure silica glass.

7. The method of claim 1, including doping the glass cylinder with either fluorine or germanium.

8. The method of claim 1, including cleaning the core body pieces after inserting the pieces inside the glass cylinder, by flowing one or more gases through the cylinder and heating the cylinder.

9. The method of claim 1, including providing the glass cylinder with an outside diameter of approximately 180 mm, and the elongating step is performed until the outside diameter of the cylinder collapses to be in the range of approximately 60 mm to 70 mm.

10. The method of claim 1, wherein the elongating step is performed so that the finished core rod has an overall length in the range of approximately 20 to 30 meters.

11. The method of claim 1, including performing the cutting step so that the core rod sections are each approximately 1900 mm in length.

12. The method of claim 1, including cutting the finished core rod in the region of outwardly facing ends of the first and the last core body pieces inserted in the cylinder.

13. The method of claim 1, including trimming end portions of the cut core rod sections that have a non-uniform cross section.

* * * * *